(12) United States Patent
Adan et al.

(10) Patent No.: US 12,141,672 B2
(45) Date of Patent: Nov. 12, 2024

(54) DELAYED RESPONSES BY COMPUTATIONAL ASSISTANT

(71) Applicant: GOOGLE LLC, Mountain View, CA (US)

(72) Inventors: Yariv Adan, Cham (CH); Vladimir Vuskovic, Zollikerberg (CH); Behshad Behzadi, Freienbach (CH)

(73) Assignee: GOOGLE LLC, Moutain View, CA (US)

( * ) Notice: Subject to any disclaimer, the term of this patent is extended or adjusted under 35 U.S.C. 154(b) by 0 days.

(21) Appl. No.: 18/367,828

(22) Filed: Sep. 13, 2023

(65) Prior Publication Data

US 2024/0005125 A1  Jan. 4, 2024

Related U.S. Application Data

(63) Continuation of application No. 17/982,815, filed on Nov. 8, 2022, now Pat. No. 11,790,207, which is a
(Continued)

(51) Int. Cl.
*G06N 3/006* (2023.01)
*G06F 3/16* (2006.01)
(Continued)

(52) U.S. Cl.
CPC ............ *G06N 3/006* (2013.01); *G06F 3/167* (2013.01); *G06F 16/3329* (2019.01);
(Continued)

(58) Field of Classification Search
CPC ..... G06N 3/006; G06F 3/167; G06F 16/3329; G06Q 10/02; G06Q 10/063114;
(Continued)

(56) References Cited

U.S. PATENT DOCUMENTS 9,804,752 B1 * 10/2017 Mall ................. H04L 51/04
11,048,995 B2    6/2021 Adan et al.
(Continued)

FOREIGN PATENT DOCUMENTS

CN    1321296    11/2001
CN    103365761   10/2013
(Continued)

OTHER PUBLICATIONS

China National Intellectual Property Administration; Notice of Allowance issued in Application No. 201880032827.7; 6 pages; dated Jun. 14, 2023.
(Continued)

*Primary Examiner* — Yogeshkumar Patel
(74) *Attorney, Agent, or Firm* — Gray Ice Higdon

(57) ABSTRACT

An example method includes receiving, by a computational assistant executing at one or more processors, a representation of an utterance spoken at a computing device; identifying, based on the utterance, a task to be performed by the computational assistant; responsive to determining, by the computational assistant, that complete performance of the task will take more than a threshold amount of time, outputting, for playback by one or more speakers operably connected to the computing device, synthesized voice data that informs a user of the computing device that complete performance of the task will not be immediate; and performing, by the computational assistant, the task.

19 Claims, 4 Drawing Sheets

Related U.S. Application Data continuation of application No. 17/330,892, filed on May 26, 2021, now Pat. No. 11,521,037, which is a continuation of application No. 15/847,341, filed on Dec. 19, 2017, now Pat. No. 11,048,995.

(60) Provisional application No. 62/506,999, filed on May 16, 2017.

(51) Int. Cl.
| | | |
|---|---|---|
| *G06F 16/332* | (2019.01) | |
| *G06Q 10/02* | (2012.01) | |
| *G06Q 10/0631* | (2023.01) | |
| *G10L 13/00* | (2006.01) | |
| *G10L 15/22* | (2006.01) | |
| *H04M 3/493* | (2006.01) | |

(52) U.S. Cl.
CPC ..... *G06Q 10/02* (2013.01); *G06Q 10/063114* (2013.01); *G10L 15/22* (2013.01); *G10L 13/00* (2013.01); *G10L 2015/223* (2013.01); *H04M 3/4936* (2013.01); *H04M 2203/355* (2013.01)

(58) Field of Classification Search
CPC ....... G10L 15/22; G10L 13/00; G10L 15/063; G10L 15/1815; G10L 15/1822; G10L 2015/223; G10L 2015/228; H04M 3/4936; H04M 2203/355; Y02D 10/00
See application file for complete search history.

(56) References Cited

U.S. PATENT DOCUMENTS

| | | | |
|---|---|---|---|
| 11,521,037 | B2 | 12/2022 | Adan et al. |
| 2010/0004930 | A1 | 1/2010 | Strope et al. |
| 2012/0084086 | A1* | 4/2012 | Gilbert ............ G10L 15/26 704/235 |
| 2013/0152092 | A1 | 6/2013 | Yadgar |
| 2015/0121216 | A1 | 4/2015 | Brown et al. |
| 2015/0332195 | A1 | 11/2015 | Jue |
| 2015/0334346 | A1 | 11/2015 | Cheatham, III et al. |
| 2015/0348551 | A1* | 12/2015 | Gruber ............ G10L 15/1822 704/235 |
| 2016/0118036 | A1 | 4/2016 | Cheatham, III et al. |
| 2016/0203002 | A1 | 7/2016 | Kannan et al. |
| 2016/0239737 | A1 | 8/2016 | Jiang et al. |
| 2017/0068513 | A1* | 3/2017 | Stasior ............ G10L 15/22 |
| 2017/0068550 | A1 | 3/2017 | Zeitlin |
| 2017/0371724 | A1 | 12/2017 | Wagner et al. |
| 2021/0279548 | A1 | 9/2021 | Adan et al. |
| 2023/0054023 | A1 | 2/2023 | Adan et al. |

FOREIGN PATENT DOCUMENTS

| | | |
|---|---|---|
| CN | 105814535 | 7/2016 |
| CN | 105844447 | 8/2016 |
| CN | 106471570 | 3/2017 |
| JP | 2002351492 | 12/2002 |
| JP | 2004015443 | 1/2004 |
| JP | 2004318731 | 11/2004 |
| JP | 2008512789 | 4/2008 |
| JP | 2014174485 | 9/2014 |
| JP | 2015501022 | 1/2015 |
| JP | 2016076799 | 5/2016 |
| JP | 2016090681 | 5/2016 |
| JP | 2016534616 | 11/2016 |
| JP | 2020522001 | 7/2020 |
| WO | 2016111881 | 7/2016 |
| WO | 2017044163 | 3/2017 |
| WO | 2018213194 | 11/2018 |

OTHER PUBLICATIONS

European Patent Office; Communication pursuant to Article 94(3) EPC issued in Application No. 21188343.4; 5 pages; dated Apr. 5, 2023.
Japanese Patent Office; Notice of Reasons for Rejection issue in Application No. 2021-159361; 9 pages; dated May 15, 2023.
China National Intellectual Property Administration; Notification of First Office Action issued in Application No. 201880032827.7; 22 pages; dated Nov. 30, 2023.
Korean Patent Office; Notice of Office Action issued in Application No. 1Korean Patent Office; Notice of Office Action issued in Application No. 1020227028912; 8 pages; dated; 12 pages; dated Jan. 26, 2023.
Japanese Patent Office; Notice of Reasons for Rejection issue in Application No. 2021-159361; 8 pages; dated Oct. 4, 2022.
Korean Patent Office; Allowance of Patent in Application No. 1020197037012; 3 pages; dated May 25, 2022.
European Patent Office; Extended European Search Report issued in Application No. 21188343.4, 12 pages, dated Feb. 14, 2022.
Korean Patent Office; Notice of Office Action issued in Application No. 1020197037012; 9 pages; dated Nov. 12, 2021.
Japanese Patent Office; Notice of Allowance issue in Application No. 2019-563497; 03 pages; dated Aug. 30, 2021.
Korean Patent Office; Notice of Office Action issued in Application No. 1020197037012; 8 pages; dated May 24, 2021.
European Patent Office; Intention to Grant issue in Application No. EP18727632.4; 44 pages; dated Apr. 20, 2021.
Japanese Patent Office; Notice of Reasons for Rejection issue in Application No. 2019-563497; 11 pages; dated Jan. 4, 2021.
European Patent Office; Communication Pursuant to Article 94(3)EPC issue in Application No. EP18727632.4; 7 page; dated Sep. 22, 2020.
International Search Report and Written Opinion of PCT Ser. No. PCT/US2018/032585; 14 pages, dated Jul. 13, 2018.
European Patent Office, Intention to Grant issued in Application No. 21188343.4, 46 pages, dated Mar. 4, 2024.
European Patent Office, Communication issued in Application No. 24194160.8; 12 pages; dated Sep. 11, 2024.

* cited by examiner

DELAYED RESPONSES BY COMPUTATIONAL ASSISTANT

BACKGROUND

Some computing platforms may provide a user interface from which a user can chat, speak, or otherwise communicate with a virtual, computational assistant (e.g., also referred to as "an intelligent assistant" or simply as an "assistant") to cause the assistant to output useful information, respond to a user's needs, or otherwise perform certain operations to help the user complete a variety of real-world or virtual tasks. Unfortunately, some of the operations performed by such assistants may not be immediately performed, leaving requesting users in doubt as to whether the assistants are functioning properly or if an error occurred.

SUMMARY

In general, techniques of this disclosure may enable virtual, computational assistants executing at one or more processors (e.g., also referred to as "intelligent assistants" or simply as "assistants"), to inform users that satisfaction of spoken or verbal requests will not be immediate. For instance, a computing device may receive, via a microphone, acoustic input (e.g., audio data) that corresponds to a user utterance. Based on the acoustic input, a computational assistant may identify a task to be performed (e.g., using speech recognition). If the computational assistant determines that complete performance of the task will take longer than a threshold amount of time, the computing device may output, with one or more speakers, synthesized voice data that informs the requesting user that complete performance of the task will not be immediate. In this way, as opposed to merely performing the task without informing the user that the response will be delayed, the computational assistant may prevent the user from re-stating the utterance. By preventing the user from re-stating the utterance, the computational assistant may avoid performing duplicative tasks and avoid determining whether an utterance is a repeat or a new task to be performed, which may improve the functionality of the computational assistant (e.g., by reducing processing requirements and/or power consumption).

In one example, a method includes receiving, by a computational assistant executing at one or more processors, a representation of an utterance spoken at a computing device; identifying, based on the utterance, a task to be performed by the computational assistant; responsive to determining, by the computational assistant, that complete performance of the task will take more than a threshold amount of time, outputting, for playback by one or more speakers operably connected to the computing device, synthesized voice data that informs a user of the computing device that complete performance of the task will not be immediate; and performing, by the computational assistant, the task.

In another example, a computing system includes at least one processor; and a memory comprising instructions that, when executed, cause the at least one processor to execute a computational assistant configured to: receive a representation of an utterance spoken at one or more microphones operably connected to a computing device; identify, based on the utterance, a task to be performed by the computational assistant; responsive to determining that complete performance of the task will take more than a threshold amount of time, output, for playback by one or more speakers operably connected to the computing device, synthesized voice data that informs a user of the computing device that complete performance of the task will not be immediate; and perform the task.

In another example, a computer-readable storage medium stores instructions that, when executed, cause one or more processors of a computing system to execute a computational assistant configured to: receive a representation of an utterance spoken at one or more microphones operably connected to a computing device; identify, based on the utterance, a task to be performed by the computational assistant; responsive to determining that complete performance of the task will take more than a threshold amount of time, output, for playback by one or more speakers operably connected to the computing device, synthesized voice data that informs a user of the computing device that complete performance of the task will not be immediate; and perform the task.

The details of one or more examples are set forth in the accompanying drawings and the description below. Other features, objects, and advantages of the disclosure will be apparent from the description and drawings, and from the claims.

DETAILED DESCRIPTION

Figure 1:
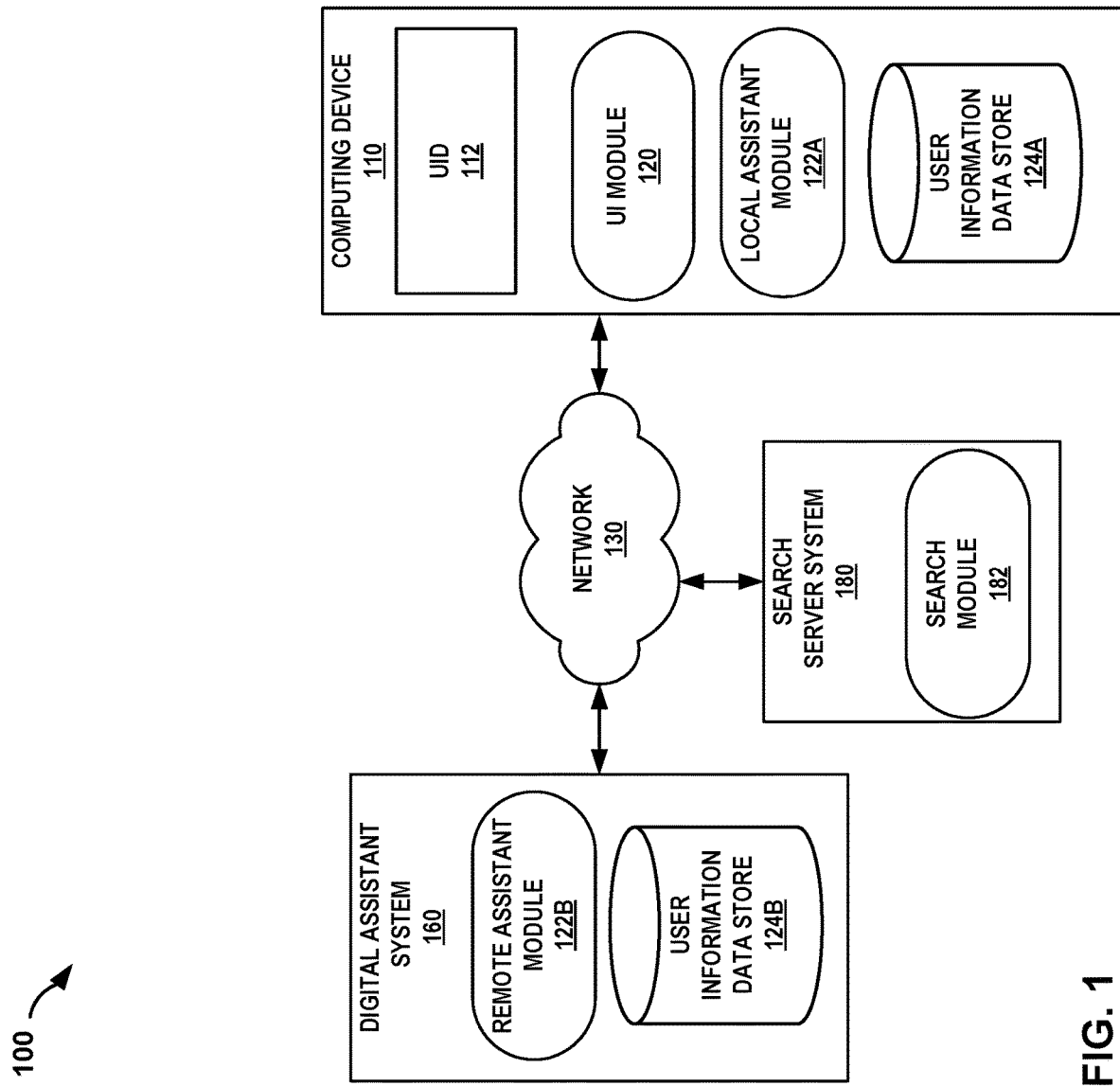
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes digital assistant system 160 in communication, via network 130, with search server system 180 and computing device 110. Although system 100 is shown as being distributed amongst digital assistant system 160, search server system 180, and computing device 110, in other examples, the features and techniques attributed to system 100 may be performed internally, by local components of computing device 110. Similarly, digital assistant system 160 may include certain components and perform various techniques that are otherwise attributed in the below description to search server system 180 and/or computing device 110.

Network 130 represents any public or private communications network, for instance, cellular, Wi-Fi, and/or other types of networks, for transmitting data between computing systems, servers, and computing devices. Digital assistant system 160 may exchange data, via network 130, with computing device 110 to provide a virtual assistant service that is accessible to computing device 110 when computing device 110 is connected to network 130. Digital assistant system 160 may exchange data, via network 130, with search server system 180 to access a search service provided by search server system 180. Computing device 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between systems 160 and 180 and computing device 110. Computing device 110, digital assistant system 160, and search server system 180 may transmit and receive data across network 130 using any suitable communication techniques. Computing device 110, digital assistant system 160, and search server system 180 may each be operatively coupled to network 130 using respective network links. The links coupling computing device 110, digital assistant system 160, and search server system 180 to network 130 may be Ethernet or other types of network connections and such connections may be wireless and/or wired connections.

Digital assistant system 160 and search server system 180 represent any suitable remote computing systems, such as one or more desktop computers, laptop computers, mainframes, servers, cloud computing systems, etc. capable of sending and receiving information both to and from a network, such as network 130. Digital assistant system 160 hosts (or at least provides access to) a virtual assistant service. Search server system 180 hosts (or at least provides access to) a search service. In some examples, digital assistant system 160 and search server system 180 represent cloud computing systems that provide access to their respective services via a cloud.

Computing device 110 represents one or more individual mobile or non-mobile computing devices. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Digital assistant system 160 and/or search server system 180 may communicate with computing device 110 via network 130 to give computing device 110 access the virtual assistant service provided by digital assistant system 160 and/or to provide computing device 110 access to the search service provided by search server system 180. In the course of providing virtual assistant services, digital assistant system 160 may communicate with search server system 180 via network 130 to obtain search results for providing a user of the virtual assistant service information to complete a task.

In the example of FIG. 1, digital assistant system 160 includes remote assistant module 122B and user information data store 124B. Remote assistant module 122B may maintain user information data store 124B as part of a virtual assistant service that digital assistant system 160 provides via network 130 (e.g., to computing device 110). Computing device 110 includes user interface device (UID) 112, user interface (UI) module 120, local assistant module 122A, and user information data store 124A. Local assistant module 122A may maintain user information data store 124A as part of a virtual assistant service that executes locally at computing device 110. Remote assistant module 122B and local assistant module 122A may be referred to collectively as assistant modules 122A and 122B. Local data store 124A and remote data store 124B may be referred to collectively as data stores 124A and 124B.

Modules 120, 122A, 122B, and 182 may perform operations described using software, hardware, firmware, or a mixture of hardware, software, and firmware residing in and/or executing at one of computing device 110, digital assistant system 160, or search server system 180. Computing device 110, digital assistant system 160, and search server system 180 may execute modules 120, 122A, 122B, and 182 with multiple processors or multiple devices. Computing device 110, digital assistant system 160, and search server system 180 may execute modules 120, 122A, 122B, and 182 as virtual machines executing on underlying hardware. Modules 120, 122A, 122B, and 182 may execute as one or more services of an operating system or computing platform. Modules 120, 122A, 122B, and 182 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or local assistant module 122A processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface related to a virtual assistant provided by local assistant module 122A and/or remote assistant module 122B. UID 112 may present a user interface related to other features of computing platforms, operating systems, applications, and/or services executing at and/or accessible from computing device 110 (e.g., e-mail, chat, online services, telephone, gaming, etc.).

UI module 120 may manage user interactions with UID 112 and other components of computing device 110 including interacting with digital assistant system 160 so as to provide assistant services via UID 112. UI module 120 may cause UID 112 to output a user interface as a user of computing device 110 views output and/or provides input at UID 112. UI module 120 and UID 112 may receive one or more indications of input (e.g., voice input, gesture input, etc.) from a user as the user interacts with the user interface, at different times and when the user and computing device 110 are at different locations. UI module 120 and UID 112 may interpret inputs detected at UID 112 and may relay information about the inputs detected at UID 112 to local assistant module 122A and/or one or more other associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as systems 160 and 180. In addition, UI module 120 may act as an intermediary between the one or more associated platforms, operating systems, applications, and/or services executing at computing device 110, and various output devices of computing device 110 (e.g., speakers, LED indicators, audio or haptic output device, etc.) to produce output (e.g., a graphic, a flash of light, a sound, a haptic response, etc.) with computing device 110.

Search module 182 may execute a search for information determined to be relevant to a search query that search module 182 automatically generates (e.g., based on contextual information associated with computing device 110) or that search module 182 receives from digital assistant system 160 or computing device 110 (e.g., as part of a task that a virtual assistant is completing on behalf of a user of computing device 110). Search module 182 may conduct an Internet search based on a search query to identify information (e.g., weather or traffic conditions, news, stock prices, sports scores, user schedules, transportation schedules, retail prices, etc.) related to the search query from amongst from a variety of information sources (e.g., either stored locally or remote to search server system 180). After executing a search, search module 182 may output the information returned from the search (e.g., the search results) to digital assistant system 160 or computing device 110.

Local assistant module 122A of computing device 110 and remote assistant module 122B of digital assistant system 160 may each perform similar functions described herein for automatically executing an assistant that is configured to perform a variety of tasks for a user. Remote assistant module 122B and user information data store 124B represent server-side or cloud implementations of an example virtual assistant whereas local assistant module 122A and user information data store 124A represent a client-side or local implementation of the example virtual assistant.

Modules 122A and 122B (collectively, "assistant modules 122") may each include respective software agents configured to execute as intelligent personal assistants that can perform tasks or services for an individual, such as a user of computing device 110. Assistant modules 122 may perform these tasks or services based on user input (e.g., detected at UID 112), location awareness (e.g., based on context), and/or the ability to access other information (e.g., weather or traffic conditions, news, stock prices, sports scores, user schedules, transportation schedules, retail prices, etc.) from a variety of information sources (e.g., either stored locally at computing device 110, digital assistant system 160, or obtained via the search service provided by search server system 180). The assistant provided by assistant modules 122 may be considered a general purpose assistant in that the assistant is capable of a wide variety of tasks. Assistant modules 122 may perform artificial intelligence and/or machine learning techniques to automatically identify and complete one or more tasks on behalf of a user.

The respective assistant provided by assistant modules 122 may be configured to perform one or more tasks in the course of executing operations to satisfy verbal or spoken requests of users of computing device 110. For instance, the assistant provided by assistant modules 122 may receive, with one or more microphones of computing device 110, acoustic input (e.g., audio data) that corresponds to an utterance a user of computing device 110 requesting performance of a particular task (e.g., "make a reservation for four people at La'French Spot at 7:30 tomorrow night").

The assistant provided by assistant modules 122 may analyze the audio data to identify a task that corresponds to the spoken utterance. For instance, the assistant provided by assistant modules 122 may utilize speech recognition to determine that the spoken utterance of "make a reservation for four people at La'French Spot at 7:30 tomorrow night" corresponds to a make reservation task with the parameters of party size: 4, date: tomorrow, time: 7:30 p.m., place: La'French Spot.

In some examples, completion of the identified task may require completion of one or more sub-tasks. Some example sub-tasks include, but are not limited to, interacting with a person other than a user of computing device 110 (e.g., by placing a call using a synthesized voice), making reservations, purchasing tickets, computations, interacting with one or more computing systems, executing a search query, creating or modifying a calendar event, etc. For instance, completion of the make reservation tasks may require a first sub-task of executing a search query to identify the restaurant in the request, and a second sub-task of actually making the reservation at the identified restaurant. In some examples, such as where completion of a particular task would not be readily apparent to the requesting user (e.g., as opposed to some home automation actions where something physically moves or changes near the requesting user), the assistant may perform a sub-task of informing the requesting user that the task has been completed. For instance, the make a reservation task may include a third sub-task of informing the requesting user that the reservation has been made.

The assistant provided by assistant modules 122 may perform the identified task. For instance, to continue with the make reservation example, the assistant provided by assistant modules 122 may perform the sub-task of identifying the restaurant in the request by outputting a request to search server system 180 to find restaurants called "La'French Spot" close to a current location of the user (or close to a predicted location of the user, if the assistant predicts the user will be traveling at the time of the reservation). After identifying the restaurant, the assistant provided by assistant modules 122 may perform the sub-task of actually making the reservation at the identified restaurant. As one example, if the identified restaurant uses an electronic reservation system accessible by the assistant (e.g., via network 130), the assistant may electronically submit a reservation request via the electronic reservation system. As another example, the assistant provided by assistant modules 122 may place a call to the identified restaurant (e.g., using contact information identified by search server system 180). Once the assistant completes the sub-task of actually making the reservation, the assistant may output an indication to the requesting user that the reservation has been made. For instance, the assistant may cause one or more speakers of computing device 110 to output synthesized voice data stating that "your reservation for four people at La'French Spot tomorrow at 7:30 pm is confirmed."

In some examples, the assistant provided by assistant modules 122 may not be able to immediately complete performance of the identified task. For instance, the assistant provided by assistant modules 122 may not be able complete performance of the identified task (or complete performance of all sub-tasks of the identified task) within a threshold amount of time (e.g., 500 milliseconds, 1 second, 2 seconds, 5 seconds, 10 seconds, 30 seconds, etc.). In other words, there may be a delay between when a user provides a spoken utterance and when the assistant can complete performance of a task identified based on the spoken utterance. During the delay, the user may be concerned that the assistant provided by assistant modules 122 is not functioning or did not receive the original request. As such, the user may re-state the utterance, which may cause the assistant provided by assistant modules 122 to perform duplicative tasks and/or have to determine whether the new utterance is a repeat of the original utterance requiring no additional action or a request to perform a new task.

In accordance with one or more techniques of this disclosure, if complete performance of a task cannot be performed immediately (e.g., within a configurable threshold amount of time), the assistant provided by assistant modules 122 may output an indication that complete performance of the task will not be immediate. For instance, the assistant provided by assistant modules 122 may output, for playback by one or more speakers operably connected to computing device 110, synthesized voice data that informs the user that complete performance of the task will not be immediate. In this way, as opposed to merely performing the task without informing the user that the response will be delayed, the assistant provided by assistant modules 122 may prevent the user from re-stating the utterance. By preventing the user from re-stating the utterance, the assistant provided by assistant modules 122 may avoid performing duplicative tasks and avoid determining whether an utterance is a repeat or a new task to be performed, which may improve the functionality of the assistant provided by assistant modules 122 (e.g., by reducing processing requirements and/or power consumption).

The assistant provided by assistant modules 122 may determine that complete performance of the task will not be immediate where complete performance of the task will take longer than a threshold amount of time (e.g., 500 milliseconds, 1 second, 2 seconds, 5 seconds, 10 seconds, 30 seconds, etc.). The assistant may determine whether complete performance of the task will take longer than the threshold amount of time based on a wide variety of factors including, but not limited to, an estimated amount of time needed for complete performance of the identified task, a type of the identified task, etc.

As one example, the assistant provided by assistant modules 122 may determine an estimated amount of time needed for complete performance of the task. If the estimated amount of time is longer than the threshold amount of time, the assistant provided by assistant modules 122 may determine that complete performance of the task will not be immediate. In some examples, the assistant may determine the estimated amount of time based on historical times for complete performance of tasks of a same type as the identified task. For instance, where the identified task is to book tickets from a popular ticket broker website, the assistant may determine the estimated amount of time needed for complete performance of the identified task based on how long it has taken the assistant to book tickets from the popular ticket broker website in the past. In some examples, the assistant may determine the estimated amount of time based on additional contextual information. For instance, where the identified task is to book tickets from a popular ticket broker website, the assistant may determine the estimated amount of time based on one or more of release date of the tickets, the popularity of the particular group/act/activity, a wait time indicated by the ticket broker, queue length, etc.

As another example, the assistant may determine that complete performance of the task will take more than the threshold amount of time in response to determining that the task (or a constituent sub-task) is not eligible for immediate performance. For instance, one or more tasks may be pre-determined to not be eligible for immediate performance (e.g., because performance of the one or more tasks may necessarily not be possible to perform immediately). A task data store accessibly by the assistant provided by assistant modules 122 may indicate which tasks are not be eligible for immediate performance. Some example tasks that may not be eligible for immediate performance include, but are not limited to, interacting with a person other than a user of the computing device, making reservations, purchasing tickets, tasks requiring extensive computation (e.g., using extensive machine learning models), interacting with one or more computing systems pre-determined to be slow, and tasks that requires occurrence of a future event (e.g., having to wait until tickets actually go on sale, providing the final score of a sports game currently in progress, etc.). As discussed above, complete performance of a task by the assistant may involve performance of multiple sub-tasks. As such, if one or more sub-tasks of a particular task is not eligible for immediate performance, the assistant may determine that complete performance of the particular task will take more than a threshold amount of time.

In some examples, the threshold amount of time (e.g., the threshold used to determine whether complete performance of the task will not be immediate) may not be user adjustable. In some example, the threshold amount of time may be user adjustable. For instance, a user may provide input specifying the threshold amount of time. As such, assistants associated with different users may use different threshold amounts of time when determining whether to alert their respective users that complete performance of the task will not be immediate.

In some examples, the threshold amount of time may be the same for every task or every task type. For instance, the assistant may use the same threshold when determining whether complete performance of an order tickets task will be immediate and when determining whether complete performance of a search query task will be immediate. In some examples, the threshold amount of time may be task dependent. For instance, the assistant may use a first threshold when determining whether complete performance of a complex task (e.g., an order tickets task) will be immediate and a second threshold (e.g., that is shorter than the first threshold) when determining whether complete performance of a simpler task (e.g., a search query task) will be immediate. As an example, as a user expects some delay for performance of more complex tasks, the assistant may output a different indication (i.e., delay notice) for when performance of complex tasks is determined not to be immediate (e.g., synthesized speech of "working"), whereas for simpler tasks that are determined to take less time, such as in the case of poor internet connection or a down website, the assistant may use a shorter threshold for triggering a delay notice.

The assistant provided by assistant modules 122 may enable modification of tasks mid-performance. For instance, after outputting synthesized voice data that informs a user of computing device 110 that complete performance of a task will not be immediate but before actually completing performance of the task, the assistant may receive, with the one or more microphones of computing device 110, acoustic input (e.g., audio data) that corresponds to an utterance the user of computing device 110 requesting modification of the performance of a task currently being performed (e.g., "change the reservation to five people"). Some example modifications include, but are not limited to, changing a time and/or date of a reservation or ticket purchase, changing a number of people included in a reservation or ticket purchase.

The assistant may then modify performance of the task based on the utterance. For instance, if the assistant is currently on a call with a restaurant making the reservation, the assistant may output, for playback by one or more speakers operably connected to a device associated with the restaurant, synthesized voice data as part of a conversation with an employee of the restaurant taking the reservation requesting that the reservation be for five people (as opposed to the original four).

The assistant provided by assistant modules 122 may enable a user to check the status of a task currently being performed. As one example, after outputting synthesized voice data that informs a user of computing device 110 that complete performance of a task will not be immediate but before actually completing performance of the task, the assistant may receive, with the one or more microphones of computing device 110, acoustic input (e.g., audio data) that corresponds to an utterance the user of computing device 110 requesting status of the performance of a task currently being performed (e.g., "have the tickets been booked yet"). Responsive to receiving the utterance requesting status, the assistant may output, for playback by the one or more speakers operably connected to computing device 110, synthesized voice data that informs the user of the status of performance of the task. In some examples, the synthesized voice data that informs the user of the status of performance of the task may include an estimate of how much longer the assistant predicts until performance of the task is complete (e.g., "about five more minutes"). As another example, the assistant provided by assistant modules 122 may query the user whether they want to receive periodic updates of the status of performance of the task. For instance, the assistant provided by assistant modules 122 may output synthesized voice data "shall I provide an update every few hours?" or similar. As another example, the assistant provided by assistant module 122 may cause computing device 110 to display a visual indicator that the assistant is performing the task. For instance, while performing the task (e.g., after informing the user of computing device 110 that complete performance of the task will not be immediate), the assistant provided by assistant module 122 may cause computing device 110 to turn on a light or other visual indicator indicating that the assistant is working on the task.

The assistant provided by assistant modules 122 may enable a user to cancel or quit a task currently being performed. As one example, if after checking the status of a task currently being performed the user decides that the task will not be completed soon enough, the user may verbally or otherwise provide input to computing device 110 to cause assistant provided by assistant modules 122 to cancel or quit the task. As another example, if the assistant provided by assistant modules 122 determines that complete performance of a task currently being performed will take too long (e.g., if complete performance will not occur until the task becomes irrelevant), the assistant may output synthesized voice data asking the user if they would like the assistant to continue performance of the task or to cancel or quit the task. As another example, if, prior to performing a task, the assistant provided by assistant modules 122 determines that the estimated amount of time to complete performance of the task will take too long (e.g., longer than a threshold), the assistant may output synthesized voice data indicating the estimated amount of time and asking the user if they would like the assistant to perform the task or to cancel the task.

The respective assistant provided by remote assistant module 122B and local assistant module 122A may, in the course of executing operations to support conversations with a user of computing device 110, automatically create, generate, or otherwise maintain personal records of information obtained during the conversations and store the personal records as values that are specific to the user, in a structured and semantic fashion as user information data store 124B and user information data store 124A, respectively. Data stores 124B and 124A may enable, respectively, the respective assistant executed by remote assistant module 122B and local assistant module 122A to quickly access the personal information (e.g., the values that are specific to the user) to complete a real-world task, a virtual task, or otherwise respond to immediate or future need of the user of computing device 110. For ease of description, the techniques of this disclosure are described primarily from the perspective of being performed by local assistant module 122A.

Assistant modules 122A and 122B may maintain user information data stores 124A and 124B as part of a virtual assistant service that assistant modules 122A and 122B together, or separately, provide to computing device 110. The assistant(s) provided by assistant modules 122 may, in the course of executing operations to support a conversation with users of computing device 110, maintain personal records of the information being automatically culled from the conversations and store the personal records in a structured and semantic fashion as user information data store 124A and 124B. Data stores 124A and 124B may enable the assistant executed by assistant modules 122A and 122B to quickly access the personal information to complete a real-world task, a virtual task, or otherwise respond to immediate and/or future needs of the user of computing device 110.

Assistant modules 122A and 122B may only retain personal records associated with a user of computing device 110 after first receiving explicit permission from the user to do-so. Thus, the user may have complete control over how the assistant collects and uses information about the user, including the permission settings and automation action usage history. For example, prior to retaining information associated with the users of computing device 110, assistant modules 122A and 122B may cause UI module 120 to present a user interface via UID 112 that requests users to select a box, click a button, state a voice input, or otherwise provide a specific input to the user interface that is interpreted by assistant modules 122A and 122B as unambiguous, affirmative consent for assistant modules 122A and 122B to collect and make use of the user's personal information.

Assistant modules 122A and 122B may encrypt or otherwise treat the information being maintained as personal records to remove the actual identity of the user before storing the personal information at data stores 124A and 124B. For example, the information may be treated by assistant modules 122A and 122B so that any personallyidentifiable information is removed from the personal records of the user when stored at data stores 124A and 124B.

Assistant modules 122A and 122B may cause UI module 120 to present a user interface via UID 112 from which the user of computing device 110, may modify or remove information from the personal records stored at data stores 124A and 124B. For example, the user interface may provide areas at which the user of computing device 110 can provide input to communicate to assistant modules 122A and 122B a command to modify or remove specific pieces of personal information. In this way, the user of computing device 110 may have complete control over the information being retained by assistant modules 122A and 122B at data stores 124A and 124B.

Each entry in the personal records stored by data stores 124A and 124B may be associated with a predefined schema that can be quickly traversed or parsed by assistant modules 122A and 122B to find the information assistant modules 122A and 122B need at a current time for understanding user needs and for helping the user to complete a task. Once personal information has been recorded as one or more values that are specific to a user, assistant modules 122A and 122B can quickly use information stored at data stores 124A and 124B to complete a task. If there is no ongoing task, assistant modules 122A and 122B may provide the user with examples of how the assistant may use the information to help the user in the future. The user may later provide input at UID 112 to command assistant modules 122A and 122B to forget or modify this information.

The values stored by data stores 124A and 124B may be textual values (e.g., names of persons, names of places, other textual descriptors of entities), numerical values (e.g., age, height, weight, other physiological data, other numerical information associated with entities), or pointers to values specific to a user (e.g., a location in memory to an entity in a knowledge graph of a user, a location in memory to a contact in an address book, etc.). In other words, a value specific to a user may take many forms and be specific to a field of a personal record that is defined by the recording schema. The value may indicate the actual information that is specific to the user or may be a reference to a location from which the information specific to the user can be retrieved.

By having access to data stores 124A and 124B, the assistant provided by assistant modules 122 may be considered to be personalized to the user. For instance, the assistant provided by assistant modules 122 may be able to perform tasks using information specific to the requesting user that is not generally available to other users.

Figure 2:
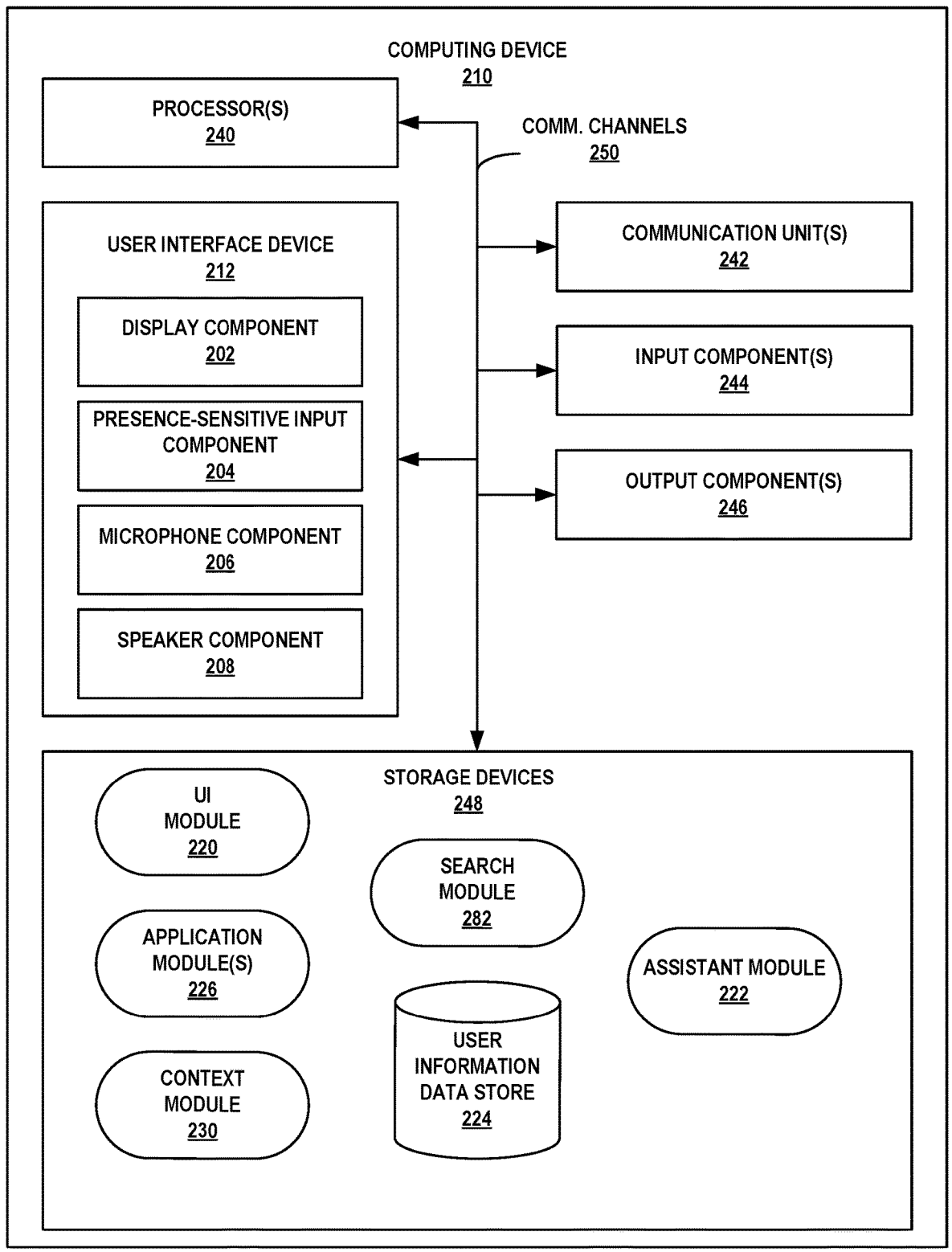
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202, presence-sensitive input component 204, microphone component 206, and speaker component 208. Storage components 248 of computing device 210 include UI module 220, assistant module 222, search module 282, one or more application modules 226, context module 230, user information data store 224, user identification module 232, action identification module 234, and authorization module 236.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices (e.g., digital assistant system 160 and/or search server system 180 of system 100 of FIG. 1) via one or more wired and/or wireless networks by transmitting and/or receiving network signals on one or more networks (e.g., network 130 of system 100 of FIG. 1). Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 110 may generate output. Examples of output are tactile, audio, and video output. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine.

UID 212 of computing device 210 may be similar to UID 112 of computing device 110 and includes display component 202, presence-sensitive input component 204, microphone component 206, and speaker component 208. Display component 202 may be a screen at which information is displayed by UID 212 while presence-sensitive input component 204 may detect an object at and/or near display component 202. Speaker component 208 may be a speaker from which audible information is played by UID 212 while microphone component 206 may detect audible input provided at and/or near display component 202 and/or speaker component 208.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, UID 212 may present a user interface (such as a graphical user interface).

Speaker component 208 may comprise a speaker built-in to a housing of computing device 210 and in some examples, may be a speaker built-in to a set of wired or wireless headphones that are operably coupled to computing device 210. Microphone component 206 may detect audible input occurring at or near UID 212. Microphone component 206 may perform various noise cancellation techniques to remove background noise and isolate user speech from a detected audio signal.

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 226, 230, and 282 may be operable by processors 240 to perform various actions, operations, or functions of computing device 210. For example, processors 240 of computing device 210 may retrieve and execute instructions stored by storage components 248 that cause processors 240 to perform the operations modules 220, 222, 226, 230, and 282. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 226, 230, and 282 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 226, 230, and 282 and data store 224. Storage components 248 may include a memory configured to store data or other information associated with modules 220, 222, 226, 230, and 282 and data store 224.

UI module 220 may include all functionality of UI module 120 of computing device 110 of FIG. 1 and may perform similar operations as UI module 120 for managing a user interface that computing device 210 provides at UID 212 for example, for facilitating interactions between a user of computing device 110 and assistant module 222. For example, UI module 220 of computing device 210 may receive information from assistant module 222 that includes instructions for outputting (e.g., displaying or playing audio) an assistant user interface. UI module 220 may receive the information from assistant module 222 over communication channels 250 and use the data to generate a user interface. UI module 220 may transmit a display or audible output command and associated data over communication channels 250 to cause UID 212 to present the user interface at UID 212.

In some examples, UI module 220 may receive an indication of one or more user inputs detected at UID 212 and may output information about the user inputs to assistant module 222. For example, UID 212 may detect a voice input from a user and send data about the voice input to UI module 220. UI module 220 may send an indication of the voice input to assistant module 222 for further interpretation. Assistant module 222 may determine, based on the voice input, that the detected voice input represents a user request for assistant module 222 to perform one or more tasks.

Application modules 226 represent all the various individual applications and services executing at and accessible from computing device 210 that may be accessed by an assistant, such as assistant module 222, to provide user with information and/or perform a task. A user of computing device 210 may interact with a user interface associated with one or more application modules 226 to cause computing device 210 to perform a function. Numerous examples of application modules 226 may exist and include, a fitness application, a calendar application, a search application, a map or navigation application, a transportation service application (e.g., a bus or train tracking application), a social media application, a game application, an e-mail application, a chat or messaging application, an Internet browser application, or any and all other applications that may execute at computing device 210.

Search module 282 of computing device 210 may perform integrated search functions on behalf of computing device 210. Search module 282 may be invoked by UI module 220, one or more of application modules 226, and/or assistant module 222 to perform search operations on their behalf. When invoked, search module 282 may perform search functions, such as generating search queries and executing searches based on generated search queries across various local and remote information sources. Search module 282 may provide results of executed searches to the invoking component or module. That is, search module 282 may output search results to UI module 220, assistant module 222, and/or application modules 226 in response to an invoking command.

Context module 230 may collect contextual information associated with computing device 210 to define a context of computing device 210. Specifically, context module 230 is primarily used by assistant module 222 to define a context of computing device 210 that specifies the characteristics of the physical and/or virtual environment of computing device 210 and a user of computing device 210 at a particular time.

As used throughout the disclosure, the term "contextual information" is used to describe any information that can be used by context module 230 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 210, communication information (e.g., text based communications, audible communications, video communications, etc.) sent and received by communication modules of computing device 210, and application usage information associated with applications executing at computing device 210 (e.g., application data associated with applications, Internet search histories, text communications, voice and video communications, calendar information, social media posts and related information, etc.). Further examples of contextual information include signals and information obtained from transmitting devices that are external to computing device 210. For example, context module 230 may receive, via a radio or communication unit of computing device 210, beacon information transmitted from external beacons located at or near a physical location of a merchant.

Assistant module 222 may include all functionality of local assistant module 122A of computing device 110 of FIG. 1 and may perform similar operations as local assistant module 122A for providing an assistant. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to remote assistant module 122B of digital assistant system 160 of FIG. 1. Assistant module 222 may rely on the information stored at data store 224, in addition to any information provided by context module 230 and/or search module 282, to perform assistant tasks.

The assistant provided by assistant modules 222 may be configured to perform one or more tasks in the course of executing operations to satisfy verbal or spoken requests of users of computing device 210. For instance, the assistant provided by assistant module 222 may receive, with one or more microphones of computing device 210, acoustic input (e.g., audio data) that corresponds to an utterance a user of computing device 210 requesting performance of a particular task. The assistant provided by assistant module 222 may analyze the audio data to identify a task that corresponds to the spoken utterance.

In accordance with one or more techniques of this disclosure, if complete performance of a task cannot be performed immediately (e.g., within a configurable threshold amount of time), the assistant provided by assistant module 222 may output an indication that complete performance of the task will not be immediate. For instance, the assistant provided by assistant module 222 may output, for playback by one or more speakers operably connected to computing device 210, synthesized voice data that informs the user that complete performance of the task will not be immediate. In this way, as opposed to merely performing the task without informing the user that the response will be delayed, the assistant provided by assistant module 222 may prevent the user from re-stating the utterance. By preventing the user from re-stating the utterance, the assistant provided by assistant module 222 may avoid performing duplicative tasks and avoid determining whether an utterance is a repeat or a new task to be performed, which may improve the functionality of the assistant provided by assistant module 222 (e.g., by reducing processing requirements and/or power consumption).

Figure 3:
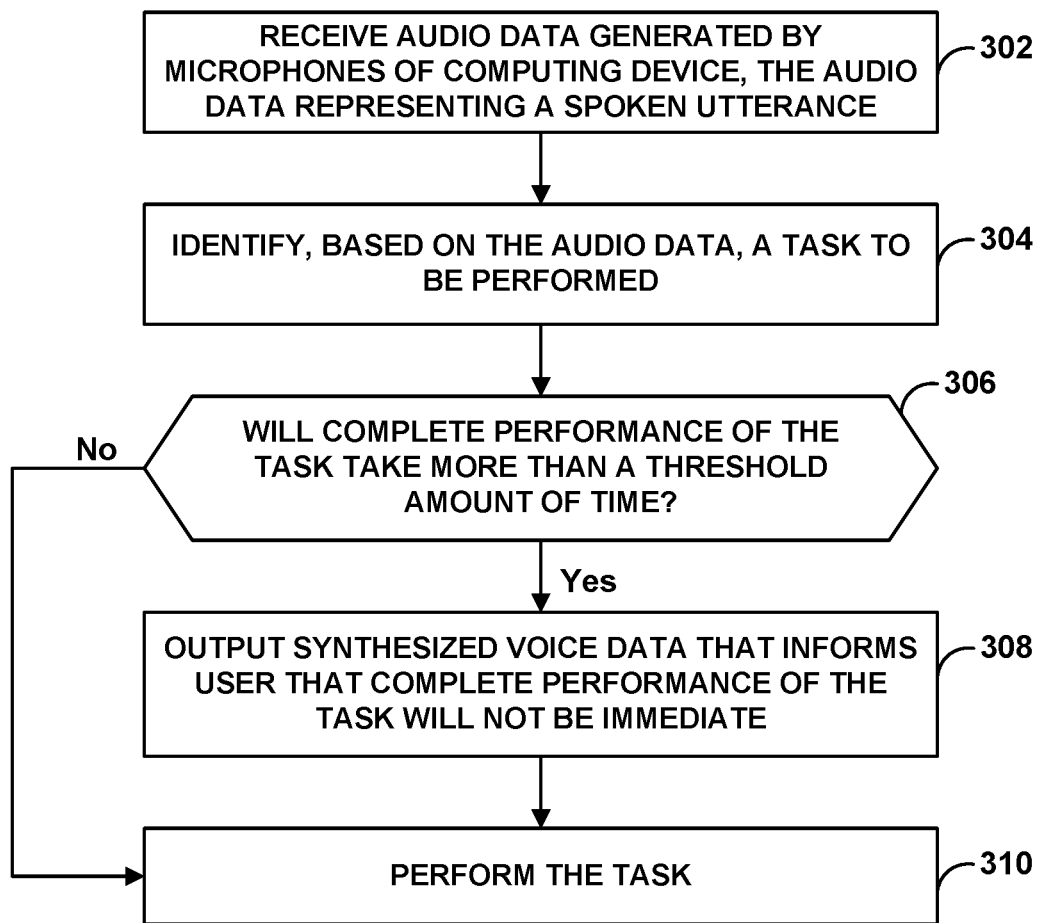
FIG. 3 is a flowchart illustrating example operations performed by one or more processors executing an example virtual assistant, in accordance with one or more aspects of the present disclosure.

FIG. 3 is a flowchart illustrating example operations performed by one or more processors executing an example virtual assistant, in accordance with one or more aspects of the present disclosure. FIG. 3 is described below in the context of system 100 of FIG. 1. For example, local assistant module 122A while executing at one or more processors of computing device 110 may perform one or more of operations 302-312, in accordance with one or more aspects of the present disclosure. And in some examples, remote assistant module 122B while executing at one or more processors of digital assistant system 160 may perform operations 302-312, in accordance with one or more aspects of the present disclosure. For purposes of illustration only, FIG. 3 is described below within the context of computing device 110 of FIG. 1.

In operation, computing device 110 may receive audio data generated by one or more microphones of computing device 110, the audio data representing a spoken utterance (302). For instance, in response to recognizing a spoken trigger phrase, computing device 110 may receive audio data representing a verbal utterance provided by a user computing device 110.

Computing device 110 may identify, based on the audio data, a task to be performed (304). For instance, if the utterance is the user saying "book me and my wife tickets to the later performance of Les Joyeux on our anniversary," computing device 110 may identify a book tickets task with sub-tasks of identifying the anniversary date, identifying the time of the later performance of Les Joyeux on the identified anniversary date, booking the tickets, and confirming the booking to the user.

Computing device 110 may determine whether complete performance of the task will take more than a threshold amount of time (306). As one example, computing device 110 may determine an estimated amount of time for complete performance of the task (e.g., complete performance of all of the sub-tasks). If the estimated amount of time is more than the threshold amount of time, computing device may determine that performance of the task will take more than the threshold amount of time. As another example, computing device 110 may determine whether the task, or any of the sub-tasks, is not eligible for immediate performance. In the above book tickets to Les Joyeux example, computing device 110 may determine that the sub-task of actually booking the tickets involves the computation assistant interacting with an employee of the theater, and that tasks or sub-tasks involving interactions with persons other than the user of computing device 110 are not eligible for immediate performance.

Responsive to determining that complete performance of the task will take more than the threshold amount of time ("Yes" branch of 308), computing device 110 may output, for playback by one or more speakers operably connected to computing device 110, synthesized voice data that informs the user of that complete performance of the task will not be immediate. For instance, the synthesized voice data may state that "I am working on booking the tickets and will let you know when the booking is complete."

In some examples, the synthesized voice data that informs the user of that complete performance of the task will not be immediate may be synthesized voice data that indicates a partial or lower confidence response to the utterance and that the computational assistant will follow-up in the future with a complete or higher confidence response. For instance, where the task is a search query, the synthesized voice data may indicate a partial or lower confidence response to the search query.

Computing device 110 may perform the task (310). For instance, computing device 110 may consult user information data store 124A to determine that the user's anniversary is June $9^{th}$, output a request to search server system 180 to find when Les Joyeux is being performed on the determined anniversary date, book tickets to the latest performance on the determined anniversary date, and confirm the booking to the user.

Figure 4:
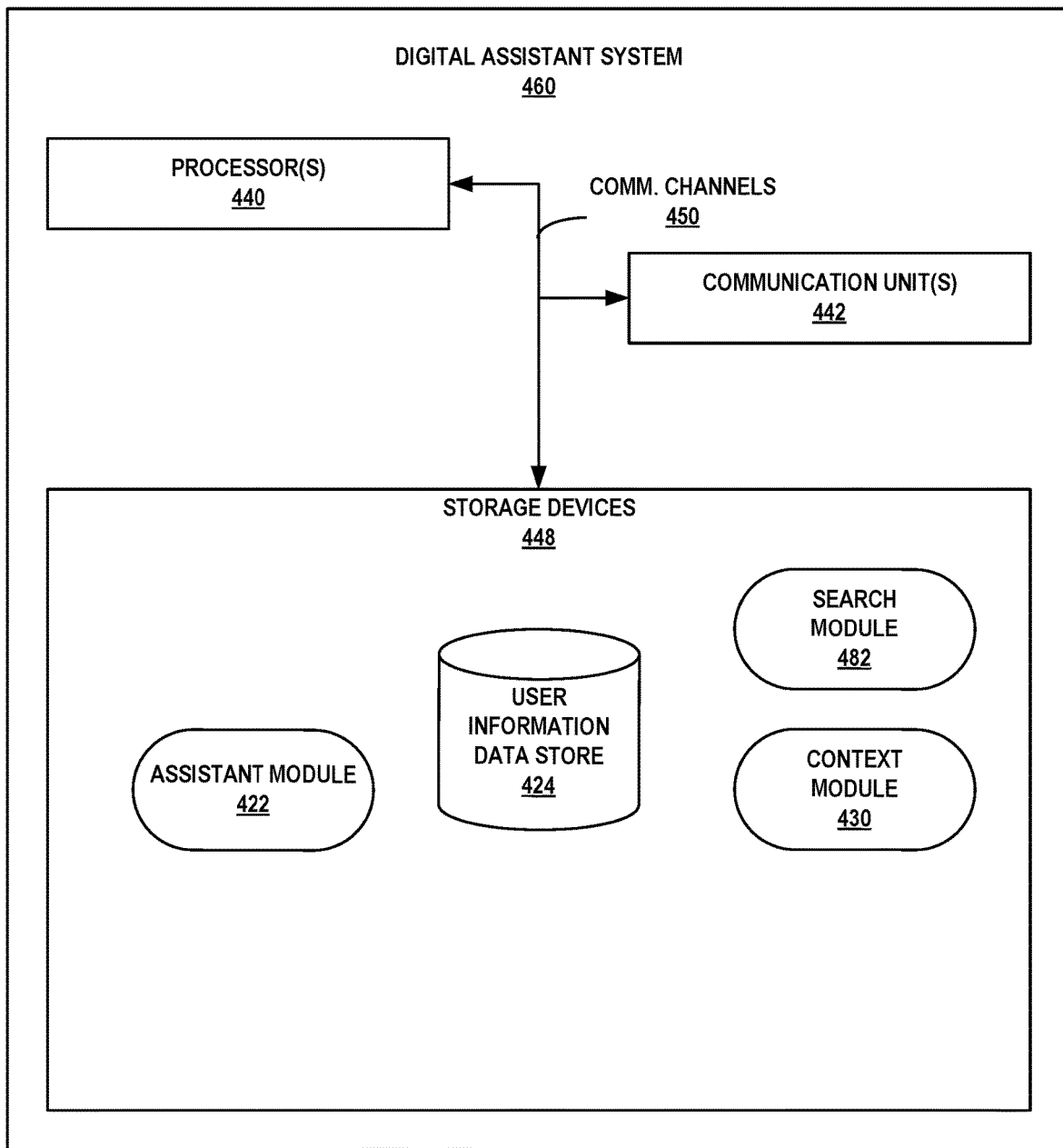
FIG. 4 is a block diagram illustrating an example computing device that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Assistant server system 460 of FIG. 4 is described below as an example of digital assistant system 160 of FIG. 1. FIG. 4 illustrates only one particular example of assistant server system 460, and many other examples of assistant server system 460 may be used in other instances and may include a subset of the components included in example assistant server system 460 or may include additional components not shown in FIG. 4.

As shown in the example of FIG. 4, assistant server system 460 includes user one or more processors 440, one or more communication units 442, and one or more storage components 448. Storage components 448 include assistant module 422, search module 482, context module 430, and user information data store 424.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of assistant server system 460 is analogous to search module 282 of computing device 210 and may perform integrated search functions on behalf of assistant server system 460. That is, search module 482 may perform search operations on behalf of assistant module 422. In some examples, search module 482 may interface with external search systems, such as search server system 180 to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

Context module 430 of assistant server system 460 is analogous to context module 230 of computing device 210. Context module 430 may collect contextual information associated with computing devices, such as computing device 110 of FIG. 1 and computing device 210 of FIG. 2, to define a context of the computing device. Context module 430 may primarily be used by assistant module 422 and/or search module 482 to define a context of a computing device interfacing and accessing a service provided by digital assistant system 160. The context may specify the characteristics of the physical and/or virtual environment of the computing device and a user of the computing device at a particular time.

Assistant module 422 may include all functionality of local assistant module 122A and remote assistant module 122B of FIG. 1, as well as assistant module 222 of computing device 210 of FIG. 2. Assistant module 422 may perform similar operations as remote assistant module 122B for providing an assistant service that is accessible via assistant server system 460. That is, assistant module 422 may act as an interface to a remote assistant service accessible to a computing device that is communicating over a network with assistant server system 460. For example, assistant module 422 may be an interface or API to remote assistant module 122B of digital assistant system 160 of FIG. 1. Assistant module 422 may rely on the information stored at data store 424, in addition to any information provided by context module 430 and/or search module 482, to perform assistant tasks.

The assistant provided by assistant module 422 may be configured to perform one or more tasks in the course of executing operations to satisfy verbal or spoken requests of users of a computing device (e.g., computing device 110 of FIG. 1). For instance, the assistant provided by assistant module 422 may receive, with one or more microphones of the computing device, acoustic input (e.g., audio data) that corresponds to an utterance a user of the computing device requesting performance of a particular task. The assistant provided by assistant modules 422 may analyze the audio data to identify a task that corresponds to the spoken utterance.

In accordance with one or more techniques of this disclosure, if complete performance of a task cannot be performed immediately (e.g., within a configurable threshold amount of time), the assistant provided by assistant module 422 may output an indication that complete performance of the task will not be immediate. For instance, the assistant provided by assistant module 422 may output, for playback by one or more speakers operably connected to the computing device, synthesized voice data that informs the user that complete performance of the task will not be immediate. In this way, as opposed to merely performing the task without informing the user that the response will be delayed, the assistant provided by assistant module 422 may prevent the user from re-stating the utterance. By preventing the user from re-stating the utterance, the assistant provided by assistant module 422 may avoid performing duplicative tasks and avoid determining whether an utterance is a repeat or a new task to be performed, which may improve the functionality of the assistant provided by assistant module 422 (e.g., by reducing processing requirements and/or power consumption).

The following examples may illustrate one or more aspects of the disclosure:

Example 1. A method comprising: receiving, by a computational assistant executing at one or more processors, a representation of an utterance spoken at a computing device; identifying, based on the utterance, a task to be performed by the computational assistant; responsive to determining, by the computational assistant, that complete performance of the task will take more than a threshold amount of time, outputting, for playback by one or more speakers operably connected to the computing device, synthesized voice data that informs a user of the computing device that complete performance of the task will not be immediate; and performing, by the computational assistant, the task.

Example 2. The method of example 1, further comprising: determining an estimated amount of time for complete performance of the task, wherein determining that complete performance of the task will take more than the threshold amount of time comprises determining that the estimated amount of time is greater than the threshold amount of time.

Example 3. The method of example 2, wherein determining the estimated amount of time comprises: determining, based on historical times for complete performance of tasks of a same type as the identified task, the estimated amount of time for complete performance of the identified task.

Example 4. The method of any combination of examples 1-3, wherein outputting the synthesized voice data that informs the user of the computing device that complete performance of the task will not be immediate comprises: outputting, for playback by the one or more speakers operably connected to the computing device, synthesized voice data that includes the estimated amount of time for complete performance of the task.

Example 5. The method of any combination of examples 1-4, further comprising: determining that complete performance of the task involves the computational assistant performing one or more sub-tasks; and determining that complete performance of the task will take more than the threshold amount of time in response to determining that at least one of the one or more sub-tasks is marked in a task data store as not being eligible for immediate performance.

Example 6. The method of example 5, wherein determining that complete performance of the task involves the computational assistant performing one or more sub-tasks comprises determining that complete performance of the task involves the computational assistant performing a sub-task of interacting with a person other than the user of the computing device; and determining, based on the task data store, that the sub-task of interacting with the person other than the user of the computing device is not eligible for immediate performance.

Example 7. The method of example 6, wherein interacting with the person other than the user of the computing device comprises: outputting, by the computational assistant and for playback by one or more speakers operably connected to a device associated with the person other than the user of the computing device, synthesized voice data as part of a conversation with the person other than the user of the computing device.

Example 8. The method of example 5, wherein sub-tasks marked in the task data store as not being eligible for immediate performance include one or more of: a sub-task of the computational assistant interacting with a person other than a user of the computing device; a sub-task of the computational assistant making reservations; a sub-task of the computational assistant purchasing tickets; a sub-task requiring extensive computation; a sub-task of the computational assistant interacting with one or more computing systems pre-determined to be slow; and a sub-task that requires occurrence of a future event.

Example 9. The method of any combination of examples 1-8, wherein the utterance is a first utterance, wherein the synthesized voice data that informs the user of the computing device that complete performance of the task will not be immediate is output at a first time, and wherein the method further comprises: receiving, by the computational assistant and at a second time that is later than the first time, a representation of a second utterance spoken at the computing device, the second utterance comprising a request for status of performance of the task; and outputting, for playback by the one or more speakers operably connected to the computing device, synthesized voice data that informs the user of the computing device of the status of performance of the task.

Example 10. The method of any combination of examples 1-9, wherein the utterance is a first utterance, the method further comprising: receiving, by the computational assistant and before performance of the task is complete, a representation of a third utterance spoken at the computing device, the third utterance comprising a request to modify one or more parameters of the task; and performing, by the computational assistant, the task with the modified one or more parameters.

Example 11. The method of example 10, wherein the request to modify one or more parameters of the task comprises one or more of: a request to change a time of a reservation or ticket purchase; and a request to change a number of people included in a reservation or ticket purchase.

Example 12. The method of any combination of examples 1-11, wherein outputting the synthesized voice data that informs the user of the computing device that complete performance of the task will not be immediate comprises: outputting, for playback by one or more speakers operably connected to the computing device, synthesized voice data that indicates a partial or lower confidence response to the utterance and that the computational assistant will follow-up in the future with a complete or higher confidence response.

Example 13. The method of example 12, wherein identifying the task comprises: identifying, based on the utterance, a search query, and wherein the synthesized voice data that indicates the partial or lower confidence response to the utterance comprises synthesized voice data that indicates a partial or lower confidence response to the search query.

Example 14. The method of any combination of examples 1-13, wherein the computational assistant is a general purpose computational assistant capable of performing tasks other than the identified task.

Example 15. The method of any combination of examples 1-14, wherein the computational assistant is a personalized to the user.

Example 16. The method of any combination of examples 1-15, further comprising: displaying, at the computing device and prior to complete performance of the task, a visual indicator that the assistant is performing the task.

Example 17. A computing system comprising: a communications module; at least one processor; and at least one memory comprising instructions that when executed, cause the at least one processor to provide an assistant configured to perform the method of any combination of examples 1-16.

Example 18. A computing system comprising: a communications module; and means for performing the method of any combination of examples 1-16.

Example 19. A computer-readable storage medium comprising instructions that, when executed, cause at least one processor of a computing system to perform the method of any combination of examples 1-16.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A system comprising:
   at least one processor; and
   memory storing instructions that, when executed, the at least one processor is operable to:
   receive a representation of an utterance directed to a computing device;
   identify, based on the utterance, a task to be completed by a computational assistant executing at least in part at the computing device;
   determine whether the task to be completed by the computational assistant involves using extensive machine learning models;
   in response to determining that the task to be completed by the computational assistant involves extensive computation using the extensive machine learning models:
   cause, to be output for playback by one or more speakers operably connected to the computing device, synthesized voice data that informs the user of the computing device that completing performance of the task will not be immediate; and
   subsequent to the computational assistant performing the extensive computation:
   cause, to be output for playback by one or more of the speakers operably connected to the computing device, additional synthesized voice data that informs the user of the computing device that performance of the task is completed.

2. The system of claim 1, wherein the at least one processor is further operable to:
   determine an estimated amount of time for the computational assistant to perform the extensive computation, wherein the synthesized voice data that informs the user of the computing device that completing performance of the task will not be immediate includes the estimated amount of time for the computational assistant to complete performance of the task.

3. The system of claim 2, wherein the instructions to determine the estimated amount of time for the computational assistant to perform the extensive computation comprise instructions to:
  determine, based on historical times for performing extensive computation of other tasks of a same type as the task, the estimated amount of time for the computational assistant to perform the extensive computation.

4. The system of claim 1, wherein the utterance is a first utterance, wherein the synthesized voice data that informs the user of the computing device that complete performance of the task will not be immediate is output at a first time, and wherein the at least one processor is further operable to:
  receive, at a second time that is later than the first time, a representation of a second utterance directed to the computing device, the second utterance comprising a request for a status update regarding performance of the task; and
  cause, to be output for playback by one or more of the speakers operably connected to the computing device, further additional synthesized voice data that informs the user of the computing device of the status update regarding performance of the task.

5. The system of claim 4, wherein the at least one processor is further operable to:
  receive, at a third time that is later than the second time and prior to the extensive computation being completed, a representation of a third utterance directed to the computing device, the third utterance comprising a request to halt or quit the extensive computation.

6. The system of claim 1, wherein the utterance is a first utterance, wherein the task includes one or more parameters to be utilized by the computational assistant in performing the task, and wherein the at least one processor is further operable to:
  receive, prior to the extensive computation being completed, a representation of a second utterance directed to the computing device, the second utterance comprising a request to modify one or more of the parameters of the task; and
  cause the computational assistant to modify the extensive computation based on the modified one or more parameters.

7. The system of claim 1, wherein the utterance is a first utterance, wherein the synthesized voice data that informs the user of the computing device that complete performance of the task will not be immediate is output at a first time, and wherein the at least one processor is further operable to:
  receive, at a second time that is later than the first time and prior to the extensive computation being completed, a representation of a second utterance directed to the computing device, the second utterance comprising a request to halt or quit the extensive computation.

8. The system of claim 1, wherein the at least one processor is further operable to:
  determine a context associated with the computing device,
  wherein the instructions to identify the task to be performed by the computational assistant executing at least in part at the computing device is further based on the context associated with the computing device.

9. The system of claim 1, wherein the extensive machine learning models are hosted at a server that is in communication with the computing device, and wherein the extensive computation using the extensive machine learning models is performed at the server.

10. A method implemented by one or more processors, the method comprising:
  receiving input directed to a computing device;
  identifying, based on the input, a task to be completed by a computational assistant executing at least in part at the computing device;
  determining whether the task to be completed by the computational assistant involves using extensive machine learning models;
  in response to determining that the task to be completed by the computational assistant involves extensive computation using the extensive machine learning models:
    causing, to be output at the computing device, data that informs the user of the computing device that completing performance of the task will not be immediate; and
  subsequent to the computational assistant performing the extensive computation:
    causing, to be output at the computing device, additional data that informs the user of the computing device that performance of the task is completed.

11. The method of claim 10, further comprising:
  determining an estimated amount of time for the computational assistant to perform the extensive computation,
  wherein the data that informs the user of the computing device that completing performance of the task will not be immediate includes the estimated amount of time for the computational assistant to complete performance of the task.

12. The method of claim 11, wherein determining the estimated amount of time for the computational assistant to perform the extensive computation comprises:
  determining, based on historical times for performing extensive computation of other tasks of a same type as the task, the estimated amount of time for the computational assistant to perform the extensive computation.

13. The method of claim 10, wherein the utterance is a first utterance, wherein the synthesized voice data that informs the user of the computing device that complete performance of the task will not be immediate is output at a first time, and further comprising:
  receiving, at a second time that is later than the first time, additional input directed to the computing device, the additional input comprising a request for a status update regarding performance of the task; and
  causing, to be output at the computing device, further additional data that informs the user of the computing device of the status update regarding performance of the task.

14. The method of claim 13, further comprising:
  receiving, at a third time that is later than the second time and prior to the extensive computation being completed, further additional input directed to the computing device, the third additional input comprising a request to halt or quit the extensive computation.

15. The method of claim 10, wherein the task includes one or more parameters to be utilized by the computational assistant in performing the task, and further comprising:
  receiving, prior to the extensive computation being completed, additional input directed to the computing device, the additional input comprising a request to modify one or more of the parameters of the task; and causing the computational assistant to modify the extensive computation based on the modified one or more parameters.

16. The method of claim 10, wherein the data that informs the user of the computing device that complete performance of the task will not be immediate is output at a first time, and further comprising:
receiving, at a second time that is later than the first time and prior to the extensive computation being completed, additional input directed to the computing device, the second utterance comprising a request to halt or quit the extensive computation.

17. The method of claim 10, further comprising:
determining a context associated with the computing device,
wherein identifying the task to be performed by the computational assistant executing at least in part at the computing device is further based on the context associated with the computing device.

18. The method of claim 10, wherein the extensive machine learning models are hosted at a server that is in communication with the computing device, and wherein the extensive computation using the extensive machine learning models is performed at the server.

19. A non-transitory computer-readable storage medium storing instructions that, when executed by at least one processor, cause the at least one processor to perform operations, the operations comprising:
receiving a representation of an utterance directed to a computing device;
identifying, based on the utterance, a task to be completed by a computational assistant executing at least in part at the computing device;
determining whether the task to be completed by the computational assistant involves using extensive machine learning models;
in response to determining that the task to be completed by the computational assistant involves extensive computation using the extensive machine learning models:
causing, to be output for playback by one or more speakers operably connected to the computing device, synthesized voice data that informs the user of the computing device that completing performance of the task will not be immediate; and
subsequent to the computational assistant performing the extensive computation:
causing, to be output for playback by one or more of the speakers operably connected to the computing device, additional synthesized voice data that informs the user of the computing device that performance of the task is completed.

* * * * *